(12) United States Patent
Kline et al.

(10) Patent No.: US 10,725,623 B2
(45) Date of Patent: Jul. 28, 2020

(54) BROWSING APPLICATIONS ON MOBILE DEVICE VIA A WEARABLE DEVICE

(71) Applicant: INTERNATIONAL BUSINESS MACHINES CORPORATION, Armonk, NY (US)

(72) Inventors: Eric V. Kline, Pine Island, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 15/937,904

(22) Filed: Mar. 28, 2018

(65) Prior Publication Data

US 2019/0302972 A1    Oct. 3, 2019

(51) Int. Cl.
| | |
|---|---|
| *G06F 17/00* | (2019.01) |
| *G06F 3/0483* | (2013.01) |
| *H04W 4/02* | (2018.01) |
| *G06F 3/14* | (2006.01) |
| *G06F 3/0484* | (2013.01) |
| *G06F 3/0487* | (2013.01) |

(Continued)

(52) U.S. Cl.
CPC .......... *G06F 3/0483* (2013.01); *G06F 3/0487* (2013.01); *G06F 3/04842* (2013.01); *G06F 3/1454* (2013.01); *H04W 4/026* (2013.01); *G06F 3/011* (2013.01); *G06F 3/0304* (2013.01); *G06F 3/0346* (2013.01); *H04M 1/7253* (2013.01); *H04M 1/72561* (2013.01); *H04M 1/72583* (2013.01)

(58) Field of Classification Search
CPC ................................ G06F 3/017; H04W 4/026
USPC ........ 715/203, 778, 204, 243, 246, 788, 815
See application file for complete search history.

(56) References Cited

U.S. PATENT DOCUMENTS

| | | | |
|---|---|---|---|
| 7,355,561 B1 * | 4/2008 | Clarke | A63J 25/00 345/1.1 |
| 10,235,871 B2 * | 3/2019 | Wang | G08C 17/02 |

(Continued)

OTHER PUBLICATIONS

Sougata Sen, 'Inferring Smartphone KeyPress via Smartwatch Inertial Sensing', The Third IEEE International Workshop on Sensing Systems and Applications Using Wrist Worn Smart Devices, 2017 (Year: 2017).*

Ricardo Langner, 'VisTiles: Coordinating and Combining Co-Located Mobile Devices for Visual Data Exploration', IEEE Transactions on Visualization and Computer Graphics, vol. 24, No. 1, Jan. 2018 (Year: 2018).*

(Continued)

*Primary Examiner* — Stephen S Hong
*Assistant Examiner* — Matthew J Ludwig
(74) *Attorney, Agent, or Firm* — Cantor Colburn LLP; Tihon Poltavets

(57) ABSTRACT

Embodiments include methods, systems and computer program products for controlling a display of a first display device with a second display device. Aspects include pairing the first display device with the second display device and monitoring an orientation of the first display device and the second display device. Based on a determination that the display of the first display device is at least partially aligned with a display of the second display device, aspects also include identifying open applications on the first display device and displaying indications of the open applications on the display of the second display device. Aspects further include switching an active application on the first display device responsive to receiving a selection of one of the open applications on the second display device.

17 Claims, 4 Drawing Sheets

(51) Int. Cl.
    *G06F 3/03*         (2006.01)
    *H04M 1/725*     (2006.01)
    *G06F 3/0346*    (2013.01)
    *G06F 3/01*         (2006.01)

(56) References Cited

U.S. PATENT DOCUMENTS

| | | | |
|---|---|---|---|
| 2014/0049447 A1* | 2/2014 | Choi | G06F 3/1454 345/1.2 |
| 2014/0245215 A1 | 8/2014 | Rydenhag et al. | |
| 2014/0351215 A1 | 11/2014 | Xu et al. | |
| 2015/0215770 A1* | 7/2015 | Chan | H04W 12/04 455/456.1 |
| 2016/0351047 A1* | 12/2016 | Han | G06F 13/14 |
| 2017/0208425 A1* | 7/2017 | Fu | H04W 76/10 |
| 2017/0273127 A1* | 9/2017 | Glass | H04W 4/026 |
| 2018/0359307 A1* | 12/2018 | Mujibiya | H04L 67/06 |

OTHER PUBLICATIONS

Svitlana Popereshnyak, 'The Method of Data Exchanging Between Smartphone and Smart Watch', CADSM, Feb. 21-25, 2017, Polyana-Svalyava, Ukraine (Year: 2017).*

Sandu, Bogdan "Tab Bars in Mobile UI Design: Showcase of Impressive App Designs" retrieved from: https://ux.stackexchange.com/questions/39492/how-to-display-5-plus-horizontal-tabs-on-mobile-device;downloaded Feb. 23, 2018; 39 pgs.

Technology Blogged "FastFeed—Multi-Tab App for Enhanced Social Network Experience", downloaded from: http://www.technologyblogged.com/technology-news/fastfeed-multi-tab-app-for-enhanced-social-network-experience; downloaded Feb. 23, 2018; 5 pgs.

User Experience Stack Exchange "iphone—How to display 5 plus horizontal tabs on mobile device"; downloaded from: http://www.designyourway.net/blog/inspiration/showcase-of-tab-bars-in-mobile-ui-design/; 4 pgs.

* cited by examiner

BROWSING APPLICATIONS ON MOBILE DEVICE VIA A WEARABLE DEVICE

BACKGROUND

The present disclosure relates generally to navigating between open applications and web browser tabs on a mobile device and more specifically to navigating between open applications and web browser tabs on a mobile device using a wearable device.

Currently, when a user of a mobile device has multiple application windows, or multiple tabs in any browser, open at the same time and desires to navigate from one window to another window, or one tab to another tab in any browser, the user must press a specific button to view the tabs or windows on the mobile device screen. At this point, the user can select the desired application window or tab from the screen. Navigating between applications and browser tabs in this manner can create an interruption in the current work flow and it can be time consuming.

SUMMARY

In accordance with an embodiment, a method for controlling a display of a first display device with a second display device is provided. The method includes pairing the first display device with the second display device and monitoring an orientation of the first display device and the second display device. Based on a determination that the display of the first display device aligned with a display of the second display device, the method includes identifying open applications on the first display device and displaying indications of the open applications on the display of the second display device. The method also includes switching an active application on the first display device responsive to receiving a selection of one of the open applications on the second display device.

In accordance with another embodiment, a system controlling a display of a first display device with a second display device is provided. The system includes a processor in communication with one or more types of memory, the processor configured to pair the first display device with the second display device and monitor an orientation of the first display device and the second display device. Based on a determination that the display of the first display device aligned with a display of the second display device, the processor is further configured to identify open applications on the first display device and display indications of the open applications on the display of the second display device. The processor is also configured to switch an active application on the first display device responsive to receiving a selection of one of the open applications on the second display device.

In accordance with a further embodiment, a computer program product for controlling a display of a first display device with a second display device includes a non-transitory storage medium readable by a processing circuit and storing instructions for execution by the processing circuit for performing a method. The method includes pairing the first display device with the second display device and monitoring an orientation of the first display device and the second display device. Based on a determination that the display of the first display device aligned with a display of the second display device, the method includes identifying open applications on the first display device and displaying indications of the open applications on the display of the second display device. The method also includes switching an active application on the first display device responsive to receiving a selection of one of the open applications on the second display device.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
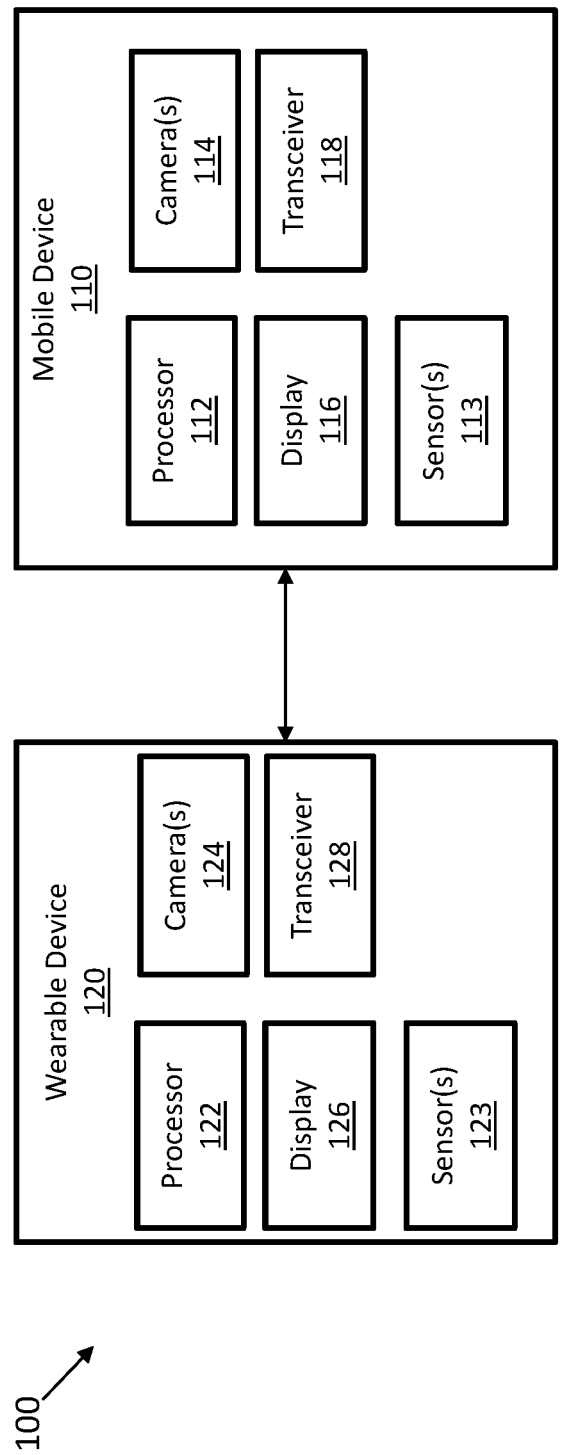
FIG. 1 is a block diagram of an exemplary system capable of implementing one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, which are related to the controlling a display of a first display device with a user interface of a second display device. The first display device can include a smartphone and the second display device can include a wearable device such as a smartwatch, or vice versa. In exemplary embodiments, the two devices are paired with one another and the user is able to use a user interface of one of the two devices to navigate between the open applications, or web browser tabs, on the other device.

Referring now to FIG. 1, a system 100 for controlling a display of a first display device with a second display device is shown. As illustrated the system 100 includes a mobile device 110 that includes a processor 112, a camera 114, a display 116, a transceiver 118, and a sensor 113. The system 100 also includes a wearable device 120, such as a smartwatch, that includes a processor 122, a camera 124, a display 126, a transceiver 128, and one or more sensors 123. The wearable device 120 and mobile device 110 are in communication with one another via the transceivers 118/128. In exemplary embodiments, the system 100 is configured to allow a user to navigate between open applications on the mobile device 110 using the display 126 of the wearable device 120.

The sensors 113 and 123 can include accelerometers and/or gyroscopes that are configured to detect an orientation of the mobile device 110 and wearable device 120, respectively. The cameras 114 and 124 can include front facing cameras that are configured to capture images in a direction normal to the display 116 and 126 of the mobile device 110 and wearable device 120, respectively. In various embodiments, the sensors 113 and 123 and/or the cameras 114 and 124 can be used to detect the orientation of the mobile device 110 and wearable device 120, respectively.

In exemplary embodiments, the mobile device 110 is paired with a wearable device 120 and the mobile device 110 transmits information regarding open applications and web browser tabs on the mobile device 110 to the wearable device 120. The wearable device 120 is configured to display information regarding the open tabs and applications on the display 126. As a result, the user can navigate between open applications on the mobile device 110 by using the display 126 of the wearable device 120. Once the user selects a tab or application the display 116 of the mobile device 110 will be changed to the selected tab or application. In exemplary embodiments, the open tabs and application window icons cab be clustered logically based on the current context and will be shown adjacent to each other in wearable device 120.

Figure 2:
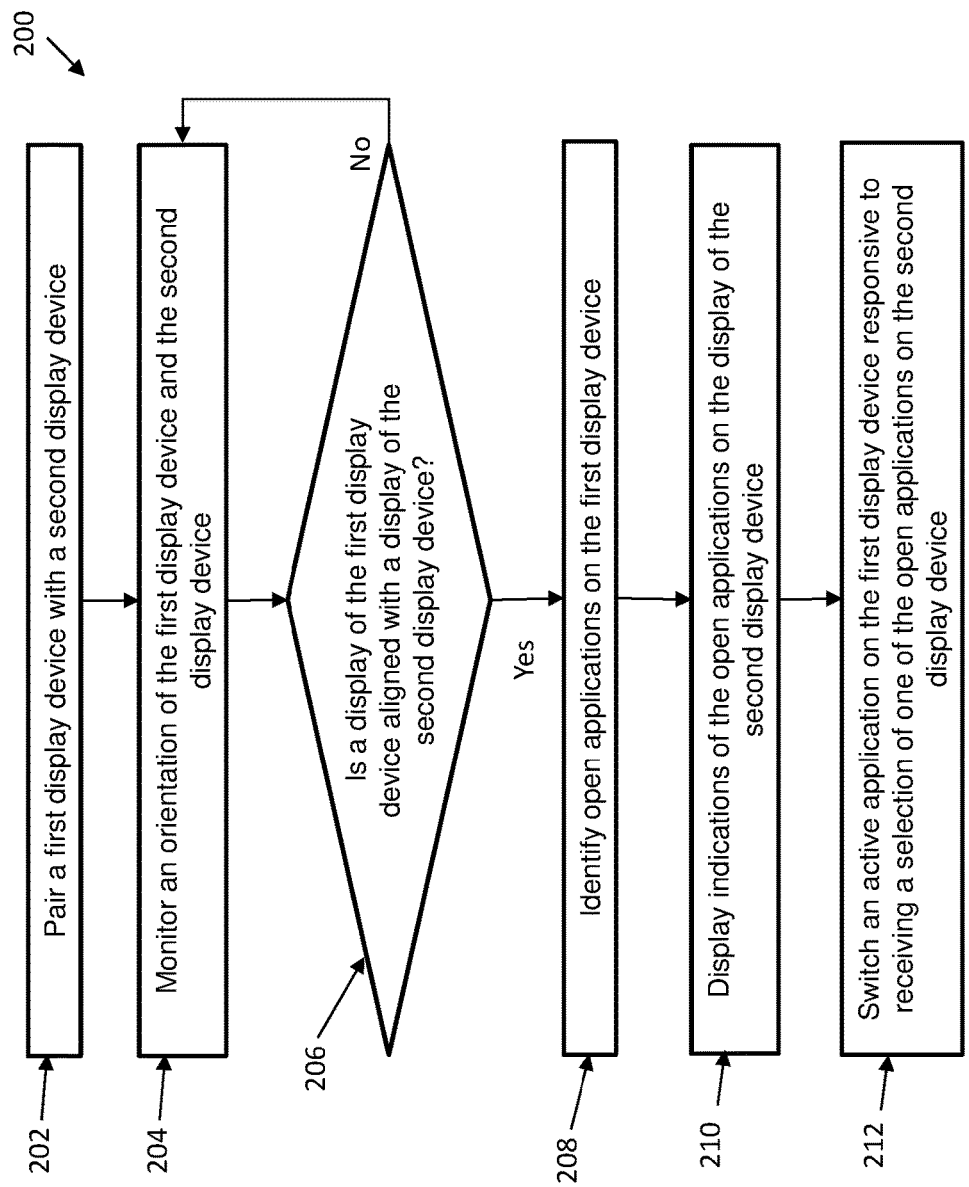
FIG. 2 is a flow diagram of a method for controlling a display of a first display device with a second display device in accordance with an exemplary embodiment.

Referring now to FIG. 2, a flow diagram is shown of a method 200 for controlling a display of a first display device with a second display device in accordance with an exemplary embodiment. As shown at block 202, the method 200 includes pairing the first display device with the second display device. Next, as shown at block 204, the method 200 includes monitoring an orientation of the first display device and the second display device. In exemplary embodiments, the orientation of the first display device and the second display device can be determined using sensors and/or cameras of the first display device and the second display device.

As shown at decision block 206, the method 200 also includes determining if the display of the first display device is aligned with a display of the second display device. In exemplary embodiments, the determination that the display of the first display device is aligned with a display of the second display device is made by determining that the display of the first display device is coplanar with the display of the second display device. In order to be considered as being coplanar the differences in the orientation of the displays must be within an alignment threshold, such as five-seven degrees in each direction. The orientations can be determined and compared by obtaining measurements from gyroscopes embedded within the display devices and/or by analyzing images captured by cameras that are normal to the displays of the display devices.

Continuing with reference to FIG. 2, based on a determination that the display of the first display device is aligned with a display of the second display device, the method 200 also includes identifying open applications on the first display device, as shown at block 208. Next, the method 200 includes displaying indications of the open applications on the display of the second display device, as shown at block 210. In exemplary embodiments, the indications of the open applications displayed on the second display device are displayed in groups and the number of groups can be based on a number of open applications. In exemplary embodiments, the selection of one of the groups of applications results in displaying indications of the open applications in the selected group on the display of the second display device. The method 200 further includes switching an active application on the first display device responsive to receiving a selection of one of the open applications on the second display device, as shown at block 212.

Figure 3:
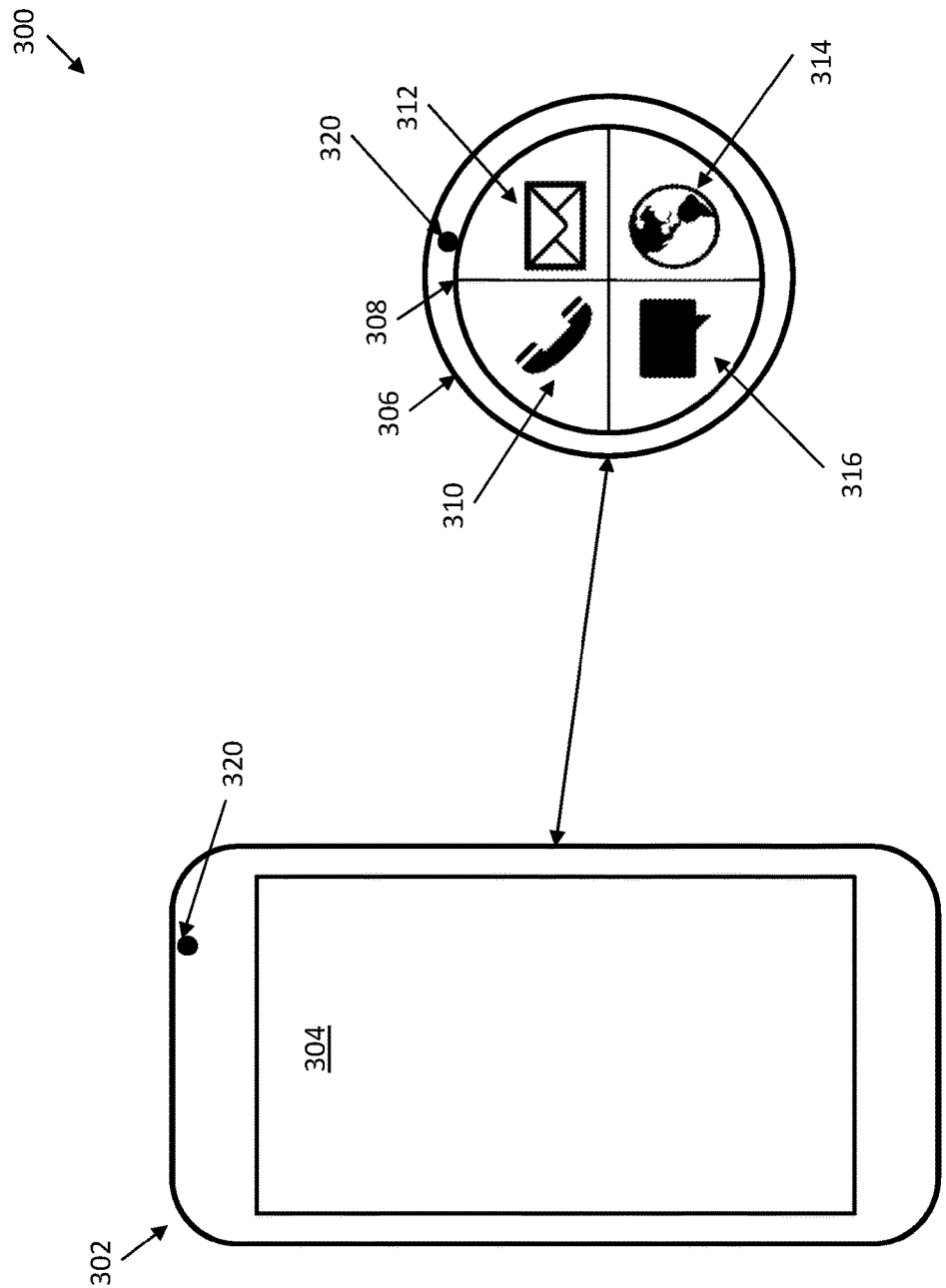
FIG. 3 is a schematic diagram of an exemplary system capable of implementing one or more embodiments of the present invention.

Referring now to FIG. 3, a schematic diagram of an exemplary system 300 capable of implementing one or more embodiments of the present invention is shown. As illustrated, the system 300 includes a smartphone 302 that includes a display 304 and a front facing camera 320. The system 300 also includes a smartwatch 306 that includes a display 308 and a front facing camera 320. The display 308 is divided into a plurality of sections that each display an icon 310, 312, 314 and 316 that correspond to open applications on the smartphone 302. Upon the selection by a user of the phone icon 310 on the display 308 of the smartwatch, the display 304 of the smartphone will change to the phone application. Upon the selection by a user of the web browser icon 314 on the display 308 of the smartwatch, the smartwatch display 308 can be updated to display information relating to multiple open browser tabs on the smartphone 302. If only one web browser tab is open, the display 304 of the smartphone will change to the open web browser tab.

In exemplary embodiments, the display 304 can be divided into a plurality of regions that each contain an icon and the dimensions of the regions can be uniform or the dimension can vary based on multiple factors. For example, the web browser icon may be allotted more space if there are multiple open web browsing tabs. In addition, a context of the mobile device and/or the wearable device can be used to assign the dimensions of the regions for each application such that applications which are more likely to be used are given larger dimensions. Accordingly, it will be easier for the user to quickly change to the most likely desired application. In one example, the most recently used applications can be given larger dimensions than less recently used applications.

In exemplary embodiments, when multiple tabs or applications are opened in a mobile device, the smartwatch will group the opened application windows and browser tabs and the applications and tabs will be displayed using based on the grouping. The user can select the desired group and can drill down to view the tabs, app window individually until the find the application or tab that they wish to open. In one embodiment, the grouping can be based on the type of applications. For example, health and fitness applications can be placed in one group, games can be placed in another group and messaging applications can be placed in another group. If the number of open applications and tabs are more than can be displayed on the second display device at one time, then the applications and tabs will be grouped, and the user can select any group and accordingly individual tab names will be shown with drill down manner.

In exemplary embodiments, the mobile device is configured to transmit information regarding each open application and/or browser tab to the wearable device and the wearable device can use this information when displaying and/or grouping the application and/or tabs. The information can include the name and type of the application and an icon associated with the application. The information can include additional metadata for each and every open browser tabs and application such as, time the tab or application was of opened and/or last used, application type like travel, news etc.

Figure 4:
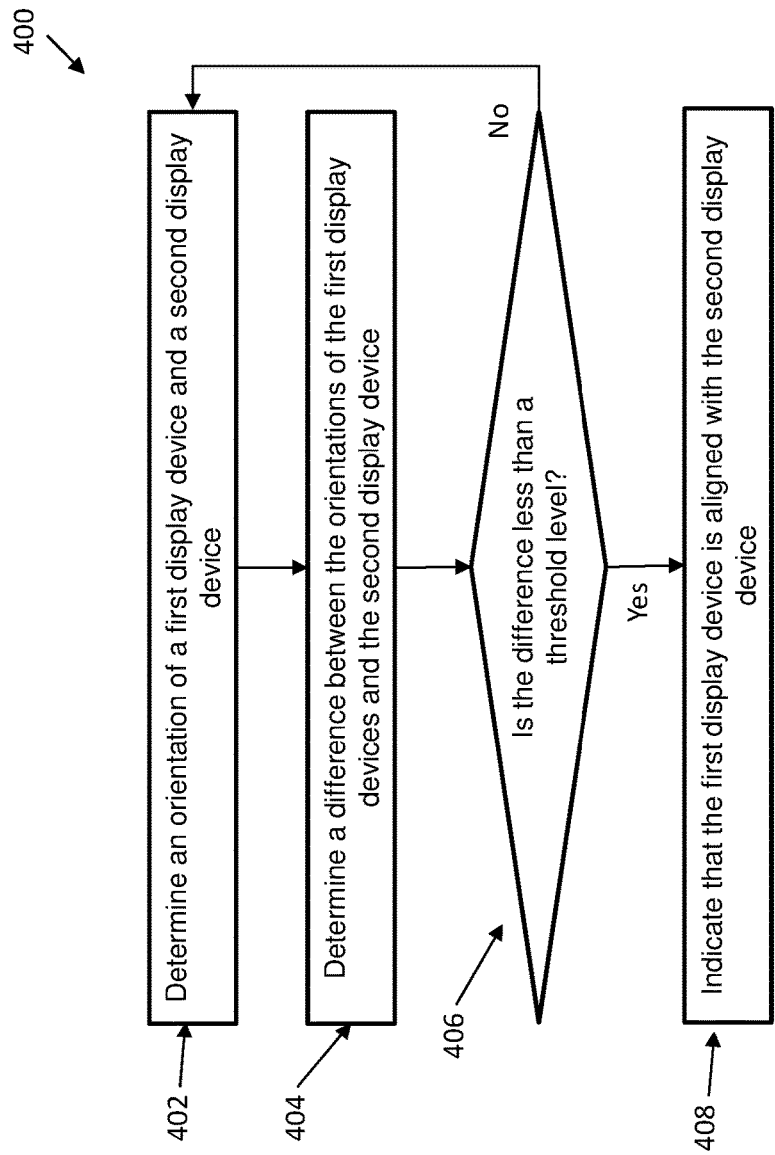
FIG. 4 is a flow diagram of a method for determining whether a display of a first display device aligned with a display of a second display device in accordance with an exemplary embodiment.

Referring now to FIG. 4, a flow diagram is shown of a method 400 for determining whether a display of a first display device aligned with a display of a second display device in accordance with an exemplary embodiment. As shown at block 402, the method 400 includes determining an orientation of a first display device and a second display device. In exemplary embodiments, the orientation of the first display device and the second display device can be made using one or more sensors or cameras embedded within the first display device and the second display device. Next, as shown at block 404, the method 400 includes determining a difference between the orientations of the first display devices and the second display device. In exemplary embodiments, the orientations are three-dimensional in nature and the difference between them can be the sum or average of the differences in each of the three-dimensions. In one example, a plane that represents the surface of each display is determined, and this plane is used to represent the orientation of the device. As shown at decision block 406, the method 400 includes determining if the difference less than a threshold level. The threshold level can be a default value set by an application or it can be a custom value that is set by the user. If the difference less than a threshold level, the method 400 proceeds to block 408 and indicates that the first display device is aligned with the second display device. In one embodiment, the difference in the orientations is calculated to be the distance between the two planes that represent the displays and the threshold can be a maximum distance allowed for determining that that the two displays are in alignment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method controlling a display of a first display device with a second display device, the computer implemented method comprises:
   pairing the first display device with the second display device;
   monitoring an orientation of the first display device and the second display device; and
   based on a determination that the display of the first display device is at least partially aligned with a display of the second display device:
      identifying a plurality of open applications on the first display device and a number of the plurality of open applications;
      based on determining that the number of the plurality of open applications is greater than a number of applications than can be displayed on the display of the second display device, generating groups of related applications from the plurality of open applications and displaying the groups of related applications;
      responsive to receiving a selection of one of the groups of related applications, displaying a set of related applications from the plurality of open applications; and
      responsive to receiving a selection of one of the set of related applications on the second display device, switching an active application on the first display device to the selection of one of the plurality of open applications.

2. The computer implemented method of claim 1, wherein the determination that a display of the first display device is at least partially aligned with a display of the second display device includes determining that a difference between the orientation of the first display device and the orientation of the second display device is less than a threshold amount.

3. The computer implemented method of claim 1, wherein the orientation of the first display device is determined based on data received from one of a camera and a sensor embedded in the first display device and the orientation of the second display device is determined based on data received from one of a camera and a sensor embedded in the second display device.

4. The computer implemented method of claim 1, wherein the first display device is a smartphone and the second display device is a smartwatch.

5. The computer implemented method of claim 1, wherein identifying the plurality of open applications includes identifying open tabs of an open web browser application.

6. The computer implemented method of claim 1, wherein a selection of one of the groups result in displaying indications of the plurality of open applications in a selected group on the display of the second display device.

7. A computer program product for controlling a display of a first display device with a second display device, the computer program product comprising:
   a non-transitory storage medium readable by a processing circuit and storing instructions for execution by the processing circuit for performing a method comprising:
   pairing the first display device with the second display device;
   monitoring an orientation of the first display device and the second display device; and
   based on a determination that the display of the first display device is at least partially aligned with a display of the second display device:

identifying a plurality of open applications on the first display device and a number of the plurality of open applications;

based on determining that the number of the plurality of open applications is greater than a number of applications than can be displayed on the display of the second display device, generating groups of related applications from the plurality of open applications and displaying the groups of related applications; and responsive to receiving a selection of one of the set of related applications on the second display device, switching an active application on the first display device to the selection of one of the plurality of open applications.

8. The computer program product of claim 7, wherein the determination that a display of the first display device is at least partially aligned with a display of the second display device includes determining that a difference between the orientation of the first display device and the orientation of the second display device is less than a threshold amount.

9. The computer program product of claim 7, wherein the orientation of the first display device is determined based on data received from one of a camera and a sensor embedded in the first display device and the orientation of the second display device is determined based on data received from one of a camera and a sensor embedded in the second display device.

10. The computer program product of claim 7, wherein the first display device is a smartphone and the second display device is a smartwatch.

11. The computer program product of claim 7, wherein identifying the plurality of open applications includes identifying open tabs of an open web browser application.

12. The computer program product of claim 7, wherein a selection of one of the groups result in displaying indications of the plurality of open applications in a selected group on the display of the second display device.

13. A system for controlling a display of a first display device with a second display device, the system comprising a processor in communication with one or more types of memory, the processor configured to:

pair the first display device with the second display device;

monitor an orientation of the first display device and the second display device; and based on a determination that the display of the first display device is at least partially aligned with a display of the second display device:

identifying a plurality of open applications on the first display device and a number of the plurality of open applications;

based on determining that the number of the plurality of open applications is greater than a number of applications than can be displayed on the display of the second display device, generating groups of related applications from the plurality of open applications and displaying the groups of related applications; and responsive to receiving a selection of one of the set of related applications on the second display device, switching an active application on the first display device to the selection of one of the plurality of open applications.

14. The system of claim 13, wherein the determination that a display of the first display device is at least partially aligned with a display of the second display device includes determining that a difference between the orientation of the first display device and the orientation of the second display device is less than a threshold amount.

15. The system of claim 13, wherein the orientation of the first display device is determined based on data received from one of a camera and a sensor embedded in the first display device and the orientation of the second display device is determined based on data received from one of a camera and a sensor embedded in the second display device.

16. The system of claim 13, wherein the first display device is a smartphone and the second display device is a smartwatch.

17. The system of claim 13, wherein identifying the plurality of open applications includes identifying open tabs of an open web browser application.

* * * * *